Sheet. 1.
2 Sheets.

K. Vogel.

Sewing Machine.

No. 1805

Reissued Nov. 1, 1864.

Witnesses.

Wm. H. Bishop
Andrew Delany

Inventor:

Katrina Vogel
by his attorney
Chas. M. Keller

Sheet 2.
2 Sheets.
K. Vogel.
Sewing Machine.
No 1805 Reissued Nov. 1, 1864.
Fig. 2.
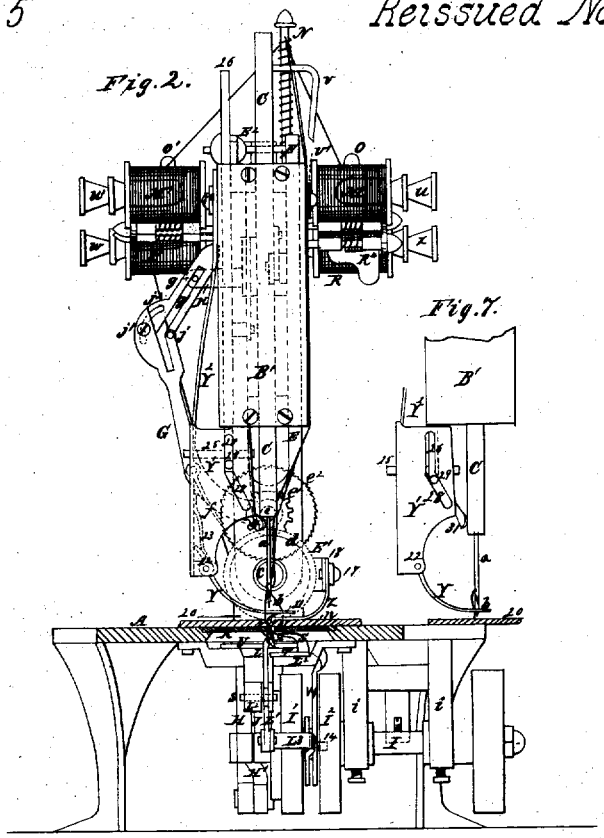
Fig. 7.
Fig. 10.
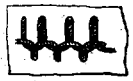
Fig. 4.
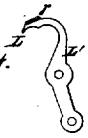
Fig. 11.
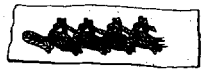
Fig. 9.
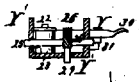
Fig. 5.
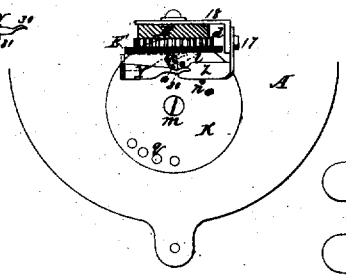
Fig. 12.
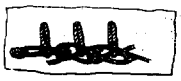
Fig. 8.
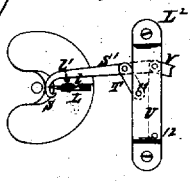
Fig. 13.
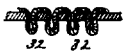
Witnesses.
W. H. Bishop
Andrew Delacy
Inventor.
Kasimir Vogel
by his Attorney
Chas. McKelley

UNITED STATES PATENT OFFICE.

KASIMIR VOGEL, OF CHELSEA, ASSIGNOR TO THE UNION BUTTON HOLE AND EMBROIDERY MACHINE COMPANY, OF BOSTON, MASSACHUSETTS.

IMPROVEMENT IN SEWING-MACHINES.

Specification forming part of Letters Patent No. 25,692, dated October 4, 1859; Reissue No. 1,805, dated November 1, 1864.

*To all whom it may concern:*

Be it known that I, KASIMIR VOGEL, of Chelsea, in the State of Massachusetts, have invented a new and Improved Sewing-Machine; and I do hereby declare that the following is a full, clear, and exact description of the same, reference being had to the accompanying drawings, forming part of this specification, in which—

Figure 1:
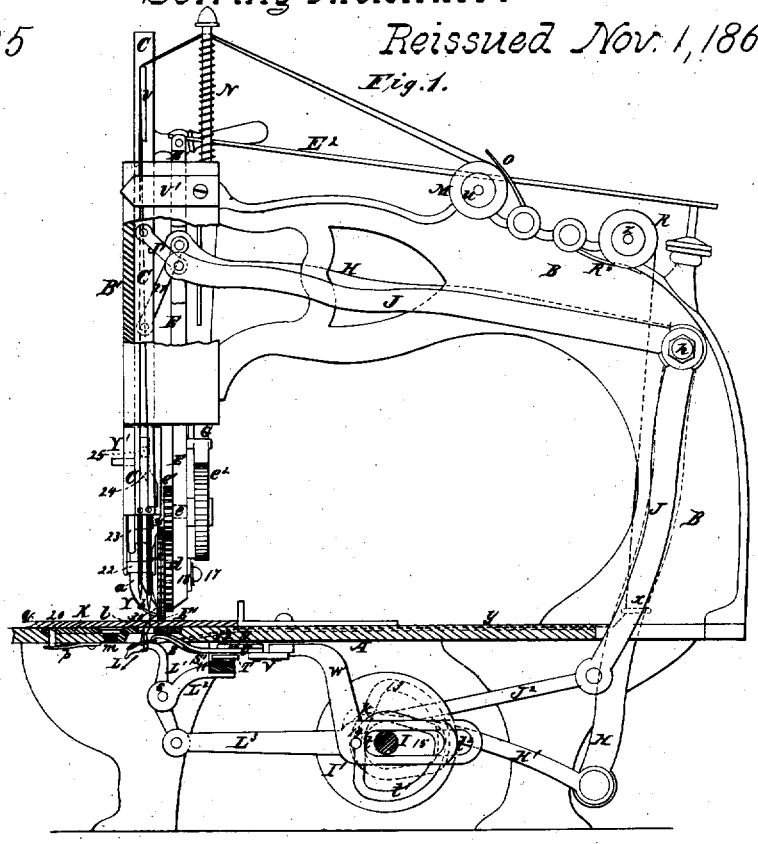
Figure 6:
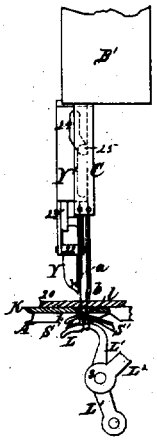
Figure 3:
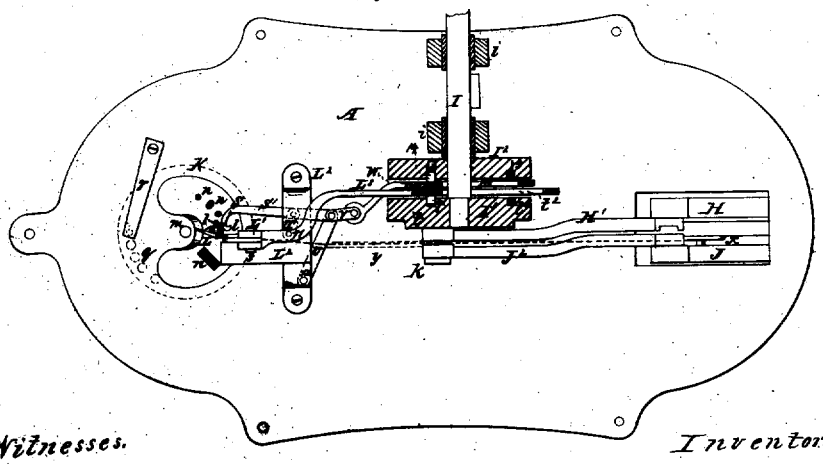

Figure 1 is a front view of a machine with all my improvements, but representing the bed-plate in section and part of the stationary arm broken away to expose the working parts. Fig. 2 is an end view of the same with the bed-plate in section. Fig. 3 is an inverted plan of the same. Fig. 4 is a section of one of the needles employed. Fig. 5 is a plan view of all the stitch-making apparatus that can be seen above the plate on which the sewing is performed. Fig. 6 is a front view of the mere stitch-making parts of the machine in a different position to that shown in Fig. 1. Fig. 7 is a side view corresponding with Fig. 6. Fig. 8 is an inverted plan of the parts below the work-plate, corresponding with Figs. 6 and 7. Fig. 9 will be hereinafter explained. Figs. 10, 11, 12, and 13 are views of some of the different kinds of stitches made by the machine.

Similar letters and numbers of reference indicate corresponding parts in the several figures.

The first part of my invention relates to the forming of seams suitable for button-holes or edging that the threads which pass around and over and form the edge shall be interlaced or united on both sides of the material with the seam which is formed through the material by the side of the edge; and this part of my invention consists in combining with the eye-pointed needle, which carries its thread through the material for forming the seam within the edge, or what is to become the edge, a suitable instrument operating above the material, and a suitable instrument operating below the material for interlacing or uniting the thread which forms the edge with the thread which forms the seam within the edge.

The second part of my invention relates to the introduction of a thread or cord, termed a "bar," on the surface of the material and under the thread or threads that connect two seams, or under the thread or threads that pass around the edge and extend to the seam within the edge; and this part of my invention consists in the employment of a suitable guide or guides for introducing and laying a thread or cord, termed a "bar," on one or both surfaces of the material and under the connecting thread or threads, in combination with the sewing mechanism or the equivalent thereof and the mechanism or the equivalent thereof for passing the thread or threads over and across the said bar or bars.

To enable others skilled in the art to make and use my invention, I will proceed to describe its construction and operation.

A is the horizontal plate or bed, on which the material is placed to be sewed.

B is the stationary arm, to which is secured a stationary guide-block, B′, containing a guide for the slider C, which carries the two needles *a b*, and also a guide for the slider E, to which the feed-wheel E′, operating on the upper surface of the material, is attached. The material is represented in brown color in Figs. 1 and 2, and marked 20. The needles are of the ordinary eye-pointed kind, and *b* is considerably longer than *a*. When used for edging or for button-holes the needle *a*, which passes by the edge, will be made blunt or sharp pointed.

The feeding apparatus represented is what may be termed a positive top wheel elastic pressure-feed, and though I do not intend here to claim any portion of it I will describe it as far as is necessary to prevent confusion of its parts in the drawings with the other parts of the machine. The slider E has the feed-wheel E′ connected with it by the pin or axle *c*, on which it rotates, and the slider E has applied to its upper end a spring, $E^2$, which operates substantially like the springs applied to the pressure-pads of most sewing-machines, and to press the wheel down upon the material.

The feed-wheel E′ has securely attached to it a spur-wheel, *d*, which gears with another spur-wheel, *e′*, on one end of a short shaft, *e*, which is fitted to turn in a bearing in the slider E, and on the other end of the said shaft there is a ratchet-wheel, $e^2$, which is acted upon to produce the rotation of the feed-wheel at proper intervals by means of a pawl, *f*, represented by dotted lines in Fig. 2.

The feed motion is given to the ratchet-wheel $e^2$ by a lever, G, which vibrates on the short shaft $e$, on which the ratchet-wheel turns; this lever having attached to it the pawl $f$. (Represented by dotted lines in Fig. 2.) The upper end of the lever G has a slot, $g'$, to receive a pin, $g$, on one arm of a lever, H, which turns on a fulcrum-pin, $h$, (see Fig. 1,) projecting from the fixed arm B. The other arm of the said lever extends down below and through a hole in the table A, and its lower end is connected by a rod, H', with a crank-pin, $k$, on the main shaft I, which is mounted in hangers $i$ $i$ under the table. In this way the lever H is vibrated once every revolution of the main shaft I, so that the pin $g$, which is carried by the lever H, works up and down in the slot, which is oblique, and vibrates the pawl-lever to turn the ratchet-wheel to impart the required feed motion to the feed-wheel. As the pawl-lever vibrates on the shaft of the ratchet-wheel they together move up and down with the slider E, which carries them and the feed-wheel, so that their operative relations are not changed by any variation in the thickness of the material to be sewed.

The regulation of the range of feed for determining the length of stitches is effected by changing the inclination of the slot $g'$, in which the pin $g$ works. To render this adjustable the part of the pawl-lever G in which the slot $g'$ is formed is separate from and attached to the other part by a hinged joint, $j$, and a fastening-screw, $j'$, which passes through a curved slot, $j^2$, concentric with the hinged joint. In this way the slot $g'$ can be set at any desired inclination to give any desired range of feed.

The lever H serves another purpose, as will be presently described, besides that of operating the feed-wheel once at every revolution of the main shaft I.

J is the lever for operating the needle-slider C, which carries the needles $a$ $b$, said lever working on the same fulcrum-pin, $h$, as the lever H, but on the opposite side of the arm B. The upper end of this lever J is connected by a link, J', with the needle-slider C, and its lower arm below the table by a rod, $J^2$, with the same crank or wrist-pin, $k$, that drives the lever H. The needles are represented arranged side by side in the lower end of the slider C, and in a plane at right angles with the line of direction of the feed; but my invention is not limited strictly to this arrangement.

The needles $a$ $b$ in their operation pass through the plate A in the usual manner; and where the said needles pass through a large opening is made in the said plate, covered by a thin steel plate, K, having a hole, $l$, Figs. 1, 2, and 3, no larger than is necessary for the two needles and their threads to work through. This needle-plate K is not a fixed plate containing but the one hole such as is used in many other machines, but is fitted to turn in a circular cavity provided for it in the plate A, and is provided with several holes, $n$ $n$, of different sizes and forms, and differently arranged to suit needles of different sizes, some of the said holes being for single needles and some for two. By turning the said plate in the cavity of the plate A either of the different holes $l$ $n$ $n$ may be presented in position to receive the needle or needles for which it is adapted. When the needle-slider C has such needle or needles fitted to it, and when the said plate is properly adjusted, it is prevented from turning by means of a spring-stop, $p$, Figs. 1 and 3, attached to the bottom of the plate A, and entering one of a series of holes, $q$ $q$, formed in it; and it is still further secured by a set-screw, $m$, which passes through a hole in its center and screws into the plate A. The same result may be obtained by providing several holes in a straight needle-plate and fitting it to slide lengthwise in the plate A, so that it may be adjusted to present either hole in position to receive the needle or needles.

L, Figs. 1, 2, and 3, is what I have before spoken of as the interlacing-needle, also represented detached and in section in Fig. 4.

This needle is substantially like what is used in some machines, making what is known as the "double-loop" stitch, having its eye $r$, Fig. 4, running in a longitudinal direction, with both orifices on the upper side of the needle. The said needle is attached to or formed of the same piece of steel with a small lever, L', which works on a fixed fulcrum, $s$, carried by a bracket, $L^2$, below the plate A, and derives its motion from a grooved cam, I', on the shaft I, the connection with the said cam being made by a rod, $L^3$, carrying a stud, $t$, which works in the groove $t'$ of the said cam, the said rod being guided in its movement by a slot, $t^2$, provided in it to receive and slide on the shaft I. The said needle L commences its advance in the direction of the arrow (shown near it in Fig. 1) as soon as the perforating-needles have completed their descent, and completes its advance before the perforating-needles have been drawn out of the material, and then remains stationary till the needles have again entered the material.

M M' are two spools of thread for supplying the perforating-needles $a$ $b$, placed on fixed spindles $u$ $u'$, arranged in line with each other and on opposite sides of the stationary arm B. From these spools the two threads, which are represented respectively of green and red color, for the sake of distinction, pass through a thread-controller, N, of well-known construction, over a guide, $v$, attached to the needle-slider C, under a spring, $v'$, attached to the arm B, and down to the eyes of the needles $a$ $b$. The requisite tension is produced upon the said threads by the friction of springs O O', applied to press upon the body of thread on the spools. P is a spool of thread for supplying the under needle, L, placed upon a fixed spindle, $w$, on one side of the arm B. From this spool the thread (represented in blue color) passes down under a guide, $x$, (see Fig. 1,) attached to the lever H, and along a groove, $y$ $y$, in the top of the plate A, and from thence down through an opening in the said plate to the needle. The necessary tension on this thread is produced by the friction of a spring, as on the other spools. R is a spool of thread placed on a spindle, *z*, on the arm B for supplying a thread for barring button-holes and for other purposes, and R* is a spring for pressing on the spool R to produce the necessary tension on its thread. This thread or cord passes down from the spool R to the groove *y*, before described, in the top of the table A, and then through an oblique hole to the under side of the table, and thence it passes up through a small hole, *l'*, in the plate K by the side of the hole through which the needles *a b* work. This thread or cord, termed a "bar," is to be drawn through a short distance and laid on the surface of the plate K in the direction in which the feed-motion operates, and the material to be sewed is laid on it, and therefore it extends over the hole through which the two needles *a b* operate, that one of them may pass on each side of it, so that the thread or threads which form the union of the two seams through the material and over the edge of the button-hole or edging shall be united or interlaced below the bar, and thereby secure it to the surface of the material. The bar thus introduced and secured will give a proper finish and better appearance to the button-hole or edge or embroidery or double seam than can be obtained without it. If desired, this thread or cord, or another like it from another spool similarly mounted, may be conducted above the table A through a suitable guide and laid on the upper surface of the material, taking care to so locate the guide that it shall bear a similar relation to the parts as the guide-hole *l'* does for introducing it to the under surface.

S, Figs. 1, 2, and 3, is the hook by whose aid the needle L effects the interlacing of its thread with the threads of the needles *a b*, the long stem S' of said hook being hinged to and carried by two vibrating arms, T U, of different lengths, which work horizontally below the plate A on fixed pins 11 and 12, secured in the said plate. The movement of the said hook, whose character will be presently described, is produced under the control of the arms T U by the connection of its stem by a link, V, with a rod, W, which rod is operated upon by a grooved cam, $1^2$, on the shaft I, the groove 13 of the said cam receiving a stud, 14, on the said rod, and the said rod being guided in the operation thus produced by its having a slot, 15, provided in it to receive and slide on the shaft I.

Z, Fig. 2, is a spring-presser, attached by a set-screw, 17, to a bent arm, 18, that is secured rigidly to the slider E, to press upon the material being sewed close in front of the needles, for the purpose of pressing the material firm and flat as it passes on toward the needles. This presser has a small tooth-like downward projection, 21, Fig. 2, at one side of its extremity to enter a button-hole and serve as a guide to the edge thereof, and enable the material in which the button-hole is being worked to be turned to work all round the hole. This form of presser is useful in all operations of sewing over an edge; but for other kinds of work a presser without a tooth 21, but otherwise similar to Z, is used.

Y, Figs. 1, 2, and 5, is the finger or thread-conductor, working on that side of the material at which the needles enter—viz., the upper side—for the purpose of causing the interlacing of the two needle-threads on that side. This finger is carried by a plate, Y', attached to the lower end of an elastic arm, $Y^2$, which is arranged to swing transversely to the direction of the feed-movement on a pin, 19, which attaches it to the back of the guide-block B'. The said spring by its flexure also permits the plate to swing back and forth in a direction parallel with the feed-movement and toward and from the needles, and hence the plate Y' and attached finger are capable of two horizontal movements at right angles to each other. The finger Y is pointed at its lower extremity and has a recess, 30, Fig. 5, in one side near the point. It is in itself elastic in an upward and downward direction; but in order that its point may move downward with great freedom, as it is required to do in the formation of the stitch, as will be presently described, the said finger is made in the form of a lever and attached to the plate Y' by a horizontal fulcrum-pin, 22, Fig. 2, and a light spring, 23, is applied to it above the said fulcrum to hold it back against the said plate; but this pin permits the descent of the lower extremity of the finger to be effected by a very gentle downward pressure. The upper part of the plate Y' has a horizontal section of the form of three sides of a quadrangle, as shown in Fig. 9, which is given to illustrate the form. In the front and back of the said plate there are two curved slots, 24, Figs. 1 and 6, to receive the two projecting ends of a pin, 25, which passes through and is secured in a vertical sliding bar, 26, which receives a vertical motion in a guide within the guide-block B' from the lever H, before described, as operating the feed, the said sliding bar 26 being connected with the said lever by a link, 27, Fig. 1. In the left-hand side of said plate Y' there is a slot, 28, Figs. 2 and 7, which receives a pin, 29, which is secured to the sliding bar 26, but arranged at right angles to the pin 25. The vertical movement of the pins 25 and 29, with the bar 26, produces the two horizontal movements of the plate Y' and attached finger Y, before mentioned, as being permitted by the elastic swinging arm $Y^2$. At the bottom of the front of the plate Y' there is a small projection, 31, which is operated upon by the movement of the needle-slider C and the elasticity of the arm $Y^2$ to produce a movement toward and from the needles in addition to that produced by the pin 29 and slot 28.

Having described the construction of the several parts of the machine, I will proceed to describe its operation for the various kinds of sewing of which it is capable, first describing its operation to produce the stitch represented in Figs. 10 and 11. In this stitch the threads of the perforating-needles are interlaced on that side of the material at which they enter. I will first suppose the stitch-making parts to be in the condition represented in Fig. 6 and partly represented in Figs. 7 and 8, and also by the bold outline in Fig. 5. The perforating-needles *a b*, which have a regular reciprocating motion produced by the crank-pin *k*, are rising, and the longer one, *b*, is withdrawn but a short distance from the material. The needle L has just previously advanced to the position in which it is stationary during about two-thirds of the time occupied in the ascent and descent of the perforating-needles, and has received upon it a loop of the thread of each perforating-needle. The hook S is also stationary between the top of the needle L and the plate K, with its point just behind the said needle; and the finger Y has just been moved forward by the action of the pin 29 in the slot 28 of the plate Y′ and brought its recess 30 to a position to receive within it the thread, which is extended between the point of the needle *a* and the material. As the perforating-needles complete their ascent the finger Y commences to be moved laterally across their path below their points by the action of the pin 25 in the slots 24, and at the same time it is permitted to be moved rapidly forward by the spring Y as the end of the slider C passes the projection 31. During the first part of the descent of the perforating-needles the lateral movement of the finger Y across the path of the needles continues, and the finger commences to move backward, and by these operations of the finger and the operation of the feed, which takes place in a direction away from the front of the machine, the thread of the needle *a* is bent in such a manner between the material and its eye, as shown in Figs. 1 and 2, which represent the needles *a b* descending, and in dotted outline in Fig. 5, that the longer needle, *b*, will pass into the said bend, and so cause a loop of the thread of the needle *a* to be formed around the needle *b* and to be retained by the thread of the latter needle after the said needle itself is withdrawn. During the first part of the descent of the needles and the above-described simultaneous operation of the finger Y the hook S moves round the front of the needles from the position shown in Fig. 8 to that shown in Fig. 3, for the purpose of catching the thread of the needle L between the said needle and the plate K, and drawing it into the form of a loop into a suitable position (represented in Fig. 3) for the perforating-needles to enter, and when the points of the said needles have entered the said loop the hook returns again to the first-described position, and there again becomes stationary. The needle L retires again from the loops of the perforating-needle threads, which it has previously retained, just as those needles have entered the loop of its own thread, and so draws its loop tightly around those needles, and immediately afterward advances again to pass between them and their threads as their upward movement commences, and so forms new loops of those threads, which it retains until the perforating-needles have again entered the loop of its own thread, when it retires again, as above mentioned.

By the above operation the thread of one of the perforating-needles is made to pass around the thread of the other one on the upper side of the material, and both the said threads are formed into loops, which are made to protrude through the material to pass into one loop and receive the succeeding one formed on the opposite side by the third thread carried by the needle L. I have attempted in Figs. 10 and 11 to represent the kind of stitch or manner of interlacing the threads thus produced, Fig. 10 being a view of the upper side and Fig. 11 a view of the under side. This kind of stitch may be made on any part of a piece of goods, both perforating-needles passing through the goods, or one of said needles passing through and the other passing over the edge, the latter mode of operation serving for button-hole working or for finishing any edge, and the former for making seams, embroidering, or any other kind of work. By simply making the shorter perforating-needle, *a*, so much shorter than *b* that in its descent its point will not arrive low enough to enter the loop of the thread of the needle L till that needle has retired and taken its loop out of the way, and without any further alteration of the machine, the thread of the needle *a* will not be carried into the loops of the thread carried by the needle L, and consequently the latter will only be interlaced with the thread carried by the other perforating-needle, *b*; but this, if the needle *a* is not too much shortened, will not prevent the needle L from entering and placing its loops in the loops of the threads of both needles *a* and *b*, and so making a secure stitch. The stitch thus formed will present on the upper surface of the material the same structure as that represented in Fig. 10, and previously described, but will present on the under side of the material the structure represented in Fig. 12. By taking away one of the perforating-needles, as well as the finger Y, the machine will be in a suitable condition for making the well-known double-looped stitch. By using more than two perforating-needles further varieties of fancy stitches can be produced.

The movement of the needle L is so timed relatively to the movements of the perforating-needle slider C that by using the said needle without thread, in combination with one or more perforating-needles carrying thread, it may at each perforation catch the thread of each perforating-needle and retain it in the form of a loop until the next perforation is commenced, and so cause the thread of each perforating-needle to be left in the cloth or other material in the form shown in Fig. 13, which represents a section of the material through the perforations made by one of the needles. The loops 32 32, protruded through the material, may be left whole or cut to produce a pile, and in either form, if the rows of loops are made very close together, a very beautiful nap-like appearance will be produced, which will be very effective in embroidery. In doing this kind of stitching the material should be placed in the machine with its face downward, that the perforating needle or needles may enter from the back.

I do not claim the use of two or more perforating-needles for carrying two or more threads through a piece of cloth or other material in the form of loops, in combination with a shuttle or a needle for carrying a locking-thread through both or all of said loops, as I am aware that such a combination of two needles and a shuttle has been used. Neither do I claim of itself the employment of a hook below the needle-plate to extend the loop of a locking-thread; nor do I claim a thread-conductor above the cloth to carry an interlocking-thread around either needle, as I am aware that such things have been used; but I do claim as my invention and desire to secure by Letters Patent—

1. In combination with the needle which carries its thread through the cloth, combined with suitable means below for concatenating the stitches to form a seam within the edge, or what is to be the edge, the employment of the thread-conductor or the equivalent thereof for uniting the thread which passes over the edge to make the edge-finish with the seam within the edge, substantially as described, and for the purpose set forth.

2. The employment of a guide or guides for introducing and laying a thread or cord, termed a "bar," on one or both surfaces of the material parallel with the seam and under the connecting thread or threads, substantially as described, in combination with the sewing mechanism or the equivalent thereof and the mechanism or the equivalent thereof for passing the thread or threads over and across said bar or bars, substantially as described.

KASIMIR VOGEL.

Witnesses:
WM. H. BISHOP,
ANDREW DE LACY.